(12) United States Patent
Shikoda et al.

(10) Patent No.: US 6,747,241 B2
(45) Date of Patent: Jun. 8, 2004

(54) LASER BEAM PROJECTOR

(75) Inventors: Shigekazu Shikoda, Akashi (JP); Tetsuya Kubota, Kobe (JP); Hirotaka Uehara, Ashiya (JP); Osamu Satoh, Akashi (JP); Tomoyuki Uno, Kobe (JP); Mamoru Nishio, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 123 days.

(21) Appl. No.: 10/020,190

(22) Filed: Dec. 18, 2001

(65) Prior Publication Data
US 2002/0079299 A1 Jun. 27, 2002

(30) Foreign Application Priority Data
Dec. 25, 2000 (JP) .......................... 2000-392079

(51) Int. Cl.[7] .............................. B23K 26/20
(52) U.S. Cl. .............................. 219/121.63; 219/121.78
(58) Field of Search ................. 219/121.78, 121.79, 219/121.6, 121.63, 121.64, 121.67

(56) References Cited

U.S. PATENT DOCUMENTS

| 4,578,554 A | 3/1986 | Coulter |
| 4,698,479 A | 10/1987 | Rando et al. |
| 5,099,102 A | 3/1992 | Orsi et al. |
| 5,216,222 A | 6/1993 | Masuda |

FOREIGN PATENT DOCUMENTS

| JP | A 62-134192 | 6/1987 |
| JP | A 3-23093 | 1/1991 |
| JP | A 10-328867 | 12/1998 |
| JP | A 2000-42854 | 2/2000 |

Primary Examiner—Samuel M. Heinrich
(74) Attorney, Agent, or Firm—Oliff & Berridge, PLC

(57) ABSTRACT

A laser beam projector to be employed in an automatic welding machine, such as a robot, includes an optical head that projects a laser beam and a holding and turning mechanism that holds and turns the optical head. The spot of the laser beam can be accurately located on the portion to be welded by turning the optical head by the holding and turning mechanism.

20 Claims, 5 Drawing Sheets

LASER BEAM PROJECTOR

BACKGROUND OF THE INVENTION

1. Field of the Invention

The present invention relates to a laser beam projector. More specifically, the present invention relates to a laser beam projector capable of being incorporated into an automatic welding head held on the free end of a robot arm or the like and of projecting a laser beam accurately on a portion to be welded.

2. Description of the Related Art

Butt welding using a laser beam is used prevalently for welding members in order to manufacture automobiles, etc. Recently, $CO_2$ lasers have been replaced by YAG lasers capable of focusing a laser beam in a spot smaller than that which is formable by $CO_2$ lasers. A welding process using a YAG laser capable of focusing a laser beam in a small spot is able to achieve fine welding using a small laser-beam spot. Incidentally, fine welding requires forming the laser-beam spot at a groove in a positional accuracy on the order of 0.05 mm.

However, the tracing accuracy of the current industrial robot is not high enough to meet the aforesaid positioning accuracy. Therefore, satisfactory welding meeting the required welding accuracy cannot be achieve simply by mounting a YAG laser beam projector on the free end of a robot arm and making the robot arm trace a weld line taught beforehand to the industrial robot. Various measures have been proposed to meet the required welding accuracy.

A laser beam machine described in JP-A 328867/1998 comprises a work table for holding a tensioned plate-shaped workpiece and axially moving the workpiece, a laser beam machining head including an optical focusing system for focusing a laser beam and capable of axial movement for focusing a laser beam on the workpiece, an upper workpiece holding member integrally provided with a laser beam projecting nozzle, a hollow, expansion connecting member interconnecting the laser beam machining head and the upper workpiece holding member such that the laser beam machining head and the upper workpiece holding member can be moved relative to each other for focusing the laser beam, and a lower stationary surface plate. The workpiece is held between the upper workpiece holding member and the lower stationary surface plate at a position near a laser beam machining position.

This known laser beam machine moves the work table supporting the workpiece thereon to make the laser beam trace a desired path. Therefore, the laser beam machine is inevitably large and is subject to restrictions on the shape of the workpiece.

SUMMARY OF THE INVENTION

The present invention has been made in view of the foregoing problem and it is therefore an object of the present invention to provide a laser beam projector capable of being mounted on an automatic welding machine, such as a welding robot, of assisting the operation of the automatic welding machine and of projecting a laser beam on a portion to be welded in a high accuracy.

According to the invention, a laser beam projector comprising: an optical head that projects a laser beam; and a holding-turning mechanism that holds and turns the optical head.

Preferably, holding-turning mechanism holds the optical head so that the optical head is able to turn about an axis passing a center of gravity of the optical head.

Preferably, the holding-turning mechanism includes a first holding-turning unit that turns the optical head in a direction perpendicular to a weld line and a second holding-turning unit that turns the optical head in a direction of the weld line.

Preferably, the holding-turning mechanism includes a turning link mechanism that transmits a driving force to the optical head in order to turn the optical head.

The optical head may be a head which emits a YAG laser beam.

The optical head may be mounted on a robot arm, and so on.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
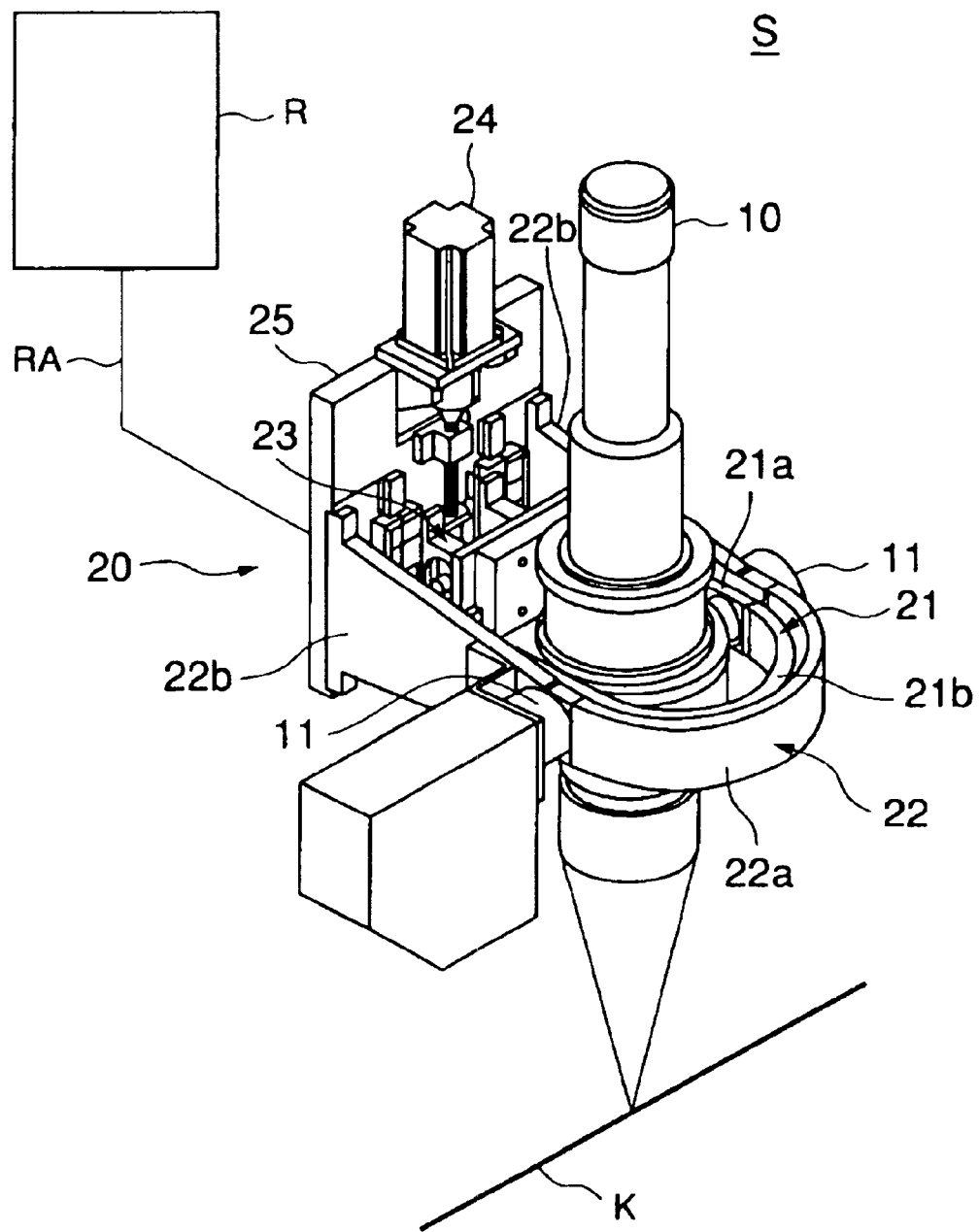
FIG. 1 is a perspective view of a laser beam projector in a preferred embodiment according to the present invention mounted on a robot.
Figure 2:
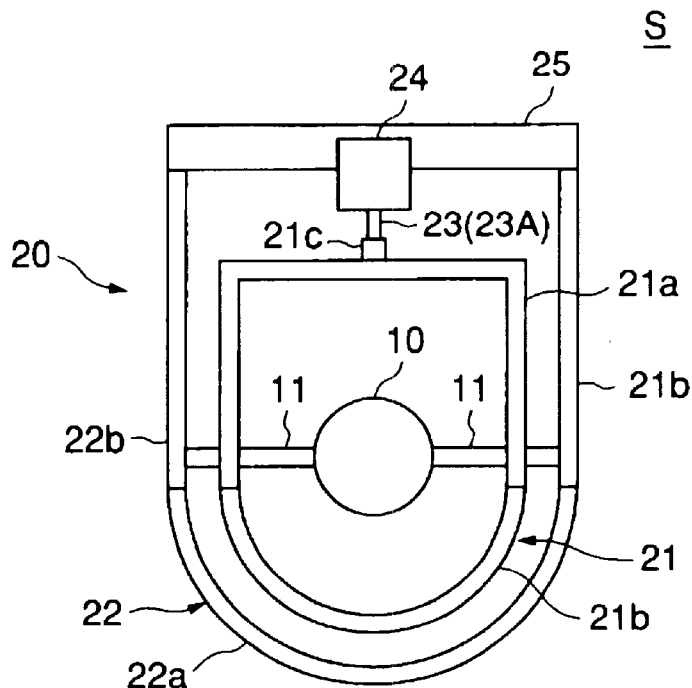
FIG. 2 is a schematic plan view of the laser beam projector shown in FIG. 1.

Referring to FIGS. 1 and 2 showing a laser beam projector S in a preferred embodiment according to the present invention, the laser beam projector S is attached to the extremity of a robot arm RA of a robot R to irradiate a weld zone accurately with a laser beam in cooperation with the motion of the robot arm. The laser beam projector S includes, as essential components, an optical head 10 provided with a YAG laser that emits a laser beam, and a holding-turning mechanism 20 capable of holding and turning the optical head 10 thereon. The optical head 10 has a shape substantially resembling a stepped cylinder. A laser beam emitted by the YAG laser is projected through a laser beam projecting end of the optical head 10 on a workpiece. The optical head 10 is the same in configuration as an optical head included in a known YAG laser beam projector and hence the detailed description thereof will be omitted.

A pair of shafts 11 are attached to parts of the cylindrical optical head 10 so as to extend in opposite directions, respectively, with their common axis passing the center of gravity of the optical head 10. The holding turning mechanism 20 turns the optical head 10 on the shafts 11. In this embodiment, the optical head 10 is held by the holding-turning mechanism 20 with its laser beam projecting end facing down.

Referring to FIG. 2, the holding-turning mechanism 20 includes a turning frame 21 supporting the optical head 10, a holding frame 22 pivotally supporting the turning frame 21, a turning mechanism 23 including a motor 24 and a turning link mechanism 23A, and a joining member 25 joined to the holding frame 22. A flange, not shown, formed integrally with the joining member 25 is fastened to a flange, not shown, attached to the extremity of the robot arm with bolts and nuts.

The turning frame 21 is formed by joining the free ends of opposite side parts of a U-shaped member 21a to the opposite ends of a semicircular member 21b. The optical head 10 is supported on the turning frame 21 with the shafts 11 fixedly extended through the opposite side parts of the U-shaped member 21a.

The holding frame 22 is a U-shaped frame formed by joining plate-shaped side members 22b to the opposite ends of a semicircular member 22a. The radius of curvature of the semicircular member 22a is greater than that of the semicircular member 21b. The turning frame 21 is surrounded by the holding frame 22. The respective semicircular members 21b of the turning frame 21 and 22a of the holding frame 22 are on the same side with respect to the optical head 10. The shafts 11 are supported for turning in bearings held on the plate-shaped members 22b of the holding frame 22.

The joining member 25 is, for example, a rectangular plate. The opposite ends of the U-shaped holding frame 22 are joined to the opposite sides of a lower part of a surface of the joining member 25. The motor 24 is fastened to an upper middle part of the front surface of the joining member 25. The flange to be joined to the flange attached to the extremity of the robot arm is formed on the back surface of the joining member 25.

Figure 3:
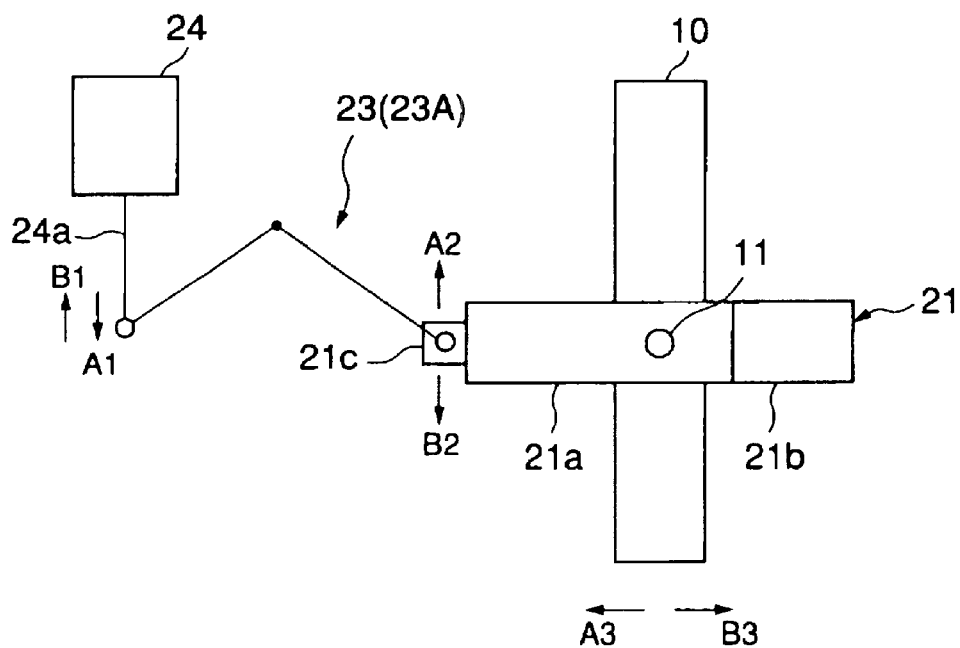
FIG. 3 is a schematic side elevation of an optical head turning mechanism included in the laser beam projector shown in FIG. 1.

Referring to FIG. 3, the turning link mechanism 23A of the turning mechanism 23 has one end pivotally joined to an axially movable drive shaft 24a included in the motor 24, and the other end pivotally joined to a joint 21c attached to the outer surface of a cross part extending between the opposite side parts of the U-shaped member 21a. When the motor 24 is driven to project the drive shaft 24a in the direction of the arrow A1 shown in FIG. 3, the turning link mechanism 23A is turned counterclockwise as viewed in FIG. 3. Consequently, the cross part of the U-shaped member 21a is pulled up in the direction of the arrow A2 and the optical head 10 is turned clockwise as viewed in FIG. 3, so that the laser beam projecting end of the optical head 10 is moved inward, i.e., toward the robot arm, as indicated by the arrow A3.

When the motor 24 is driven to retract the drive shaft 24a in the direction of the arrow B1 shown in FIG. 3, the turning link mechanism 23A is turned clockwise as viewed in FIG. 3. Consequently, the cross part of the U-shaped member 21a is pushed down in the direction of the arrow B2 and the optical head 10 is turned counterclockwise as viewed in FIG. 3, so that the laser beam projecting end of the optical head 10 is moved outward, i.e., away from the robot arm, as indicated by the arrow B3.

Since the shafts 11 of the optical head 10 are supported in the bearings on the holding frame 22 as explained above, the optical head 10 is thus turned on the shafts 11 in a direction perpendicular to a weld line (groove) K shown in FIG. 1.

According to the present embodiment, since the optical head 10 is turned on the holding frame 22 in the direction perpendicular to the weld line K such that the laser beam projected by the laser beam projector falls on the weld line K, the reaction force that acts on the holding-turning mechanism 20, when the optical head 10 is turned, is lower than the reaction force which will acts on a holding mechanism when an optical head is translated. Since the optical head 10 is supported by the shafts 11 having the common axis passing the center of gravity of the optical head 10 and the optical head 10 is turned about the common axis of the shafts 11, the moment of inertia of the optical head 10 is small and hence the reaction force that acts on the holding-turning mechanism 20 is lower. Thus, the holding-turning mechanism 20 can be formed in a very small structure and easily attached to the robot arm.

A linear motion of the drive shaft 24a of the motor 24 is converted into a turning motion of the turning frame 21 by the turning link mechanism 23A without using any reduction gear. Therefore, the turning frame 21 can be turned without any lost motion, which may be caused by backlashes in a reduction gear, and, consequently, the accuracy of laser beam projection can be improved. Moreover, weaving laser beam welding can be achieved by periodically turning the optical head 10 alternately in opposite directions.

A laser beam projector in another embodiment according to the present invention will be explained hereafter. The laser beam projector has an optical head supported for turning about two axes perpendicular to each other.

Figure 4:
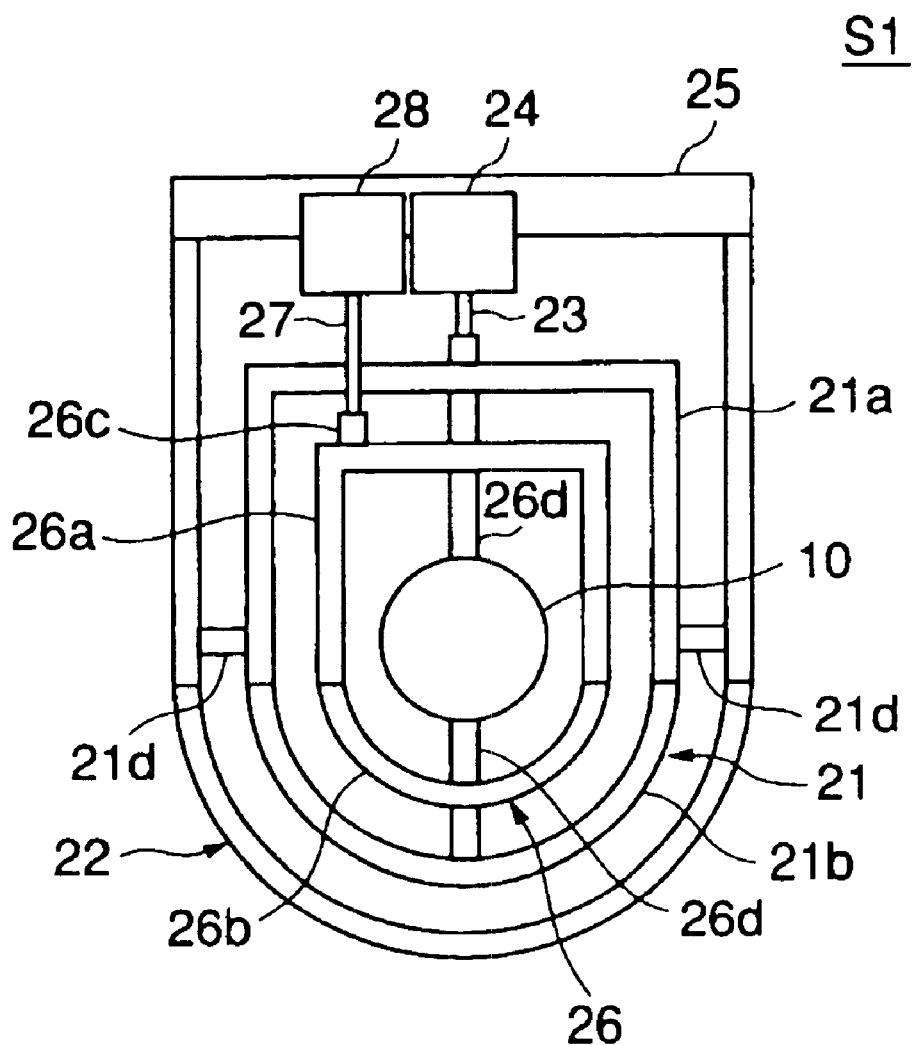
FIG. 4 is a schematic plan view of a laser beam projector in another embodiment according to the present invention.

Referring to FIG. 4 showing the laser beam projector S1 according to the present embodiment in a schematic plan view, a first turning frame 21 is supported by shafts 21d fixed thereto on a holding frame 22 such that the first turning frame 21 is able to turn about the common axis of the shafts 21d relative to the holding frame 22.

A second turning frame 26 is supported by shafts 26d fixed thereto on the first turning frame 21 such that the second turning frame 26 is able to turn about the common axis of the shafts 26d relative to the first turning frame 21. The first turning frame 21 can be turned about the common axis of the shafts 21d by a first turning mechanism 23 including a first motor 24. The second turning frame 26 can be turned about the common axis of the shafts 26d by a second turning mechanism 27 including a second motor 28.

The first turning frame 21, the holding frame 22 and the first turning mechanism 23 are similar to those of the laser beam projector S in the previous embodiment, respectively. The second turning frame 26 is formed by joining the free ends of opposite side parts of a U-shaped member 26a to the opposite ends of a semicircular member 26b. The second turning frame 26 is surrounded by the first turning frame 21. The respective semicircular members 21b of the first turning frame 21 and 26b of the second turning frame 26 are on the same side with respect to the optical head 10. The optical head 10 is supported on the second turning frame 26 with the shafts 26d fixedly extended through a middle part of the U-shaped member 26a and a middle part of the semicircular member 26b. The shafts 26d are supported for turning in bearings held on the first turning frame 21. The holding frame 22 is the same in construction as that included in the laser beam projector S in the previous embodiment. The shafts 21d fixed to the side parts of the U-shaped member 21a of the first turning frame 21 are supported in bearings held on the holding member 22.

Figure 5A:
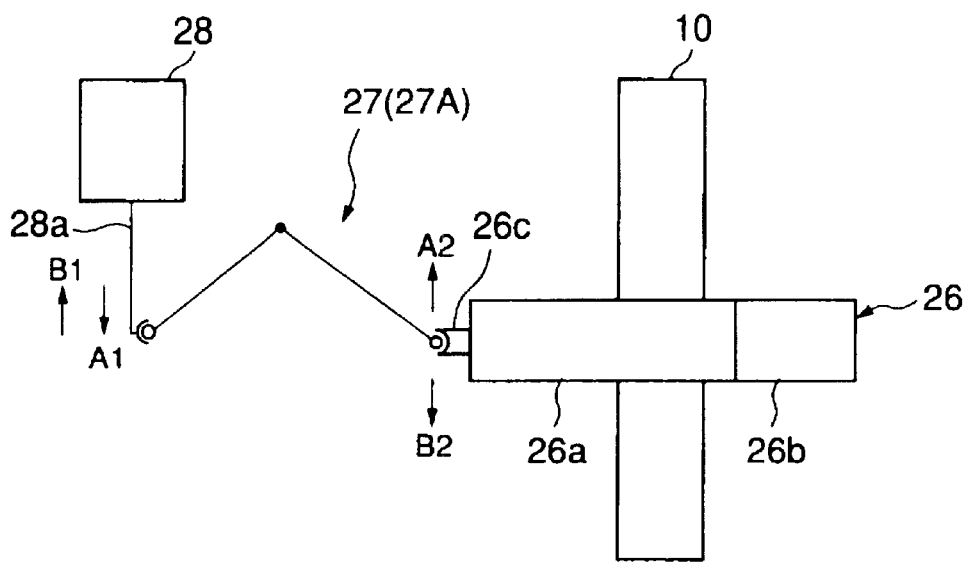
FIGS. 5A and 5B are a schematic side elevation and a schematic front elevation, respectively, of a turning mechanism included in the laser beam projector shown in FIG. 4.
Figure 5B:
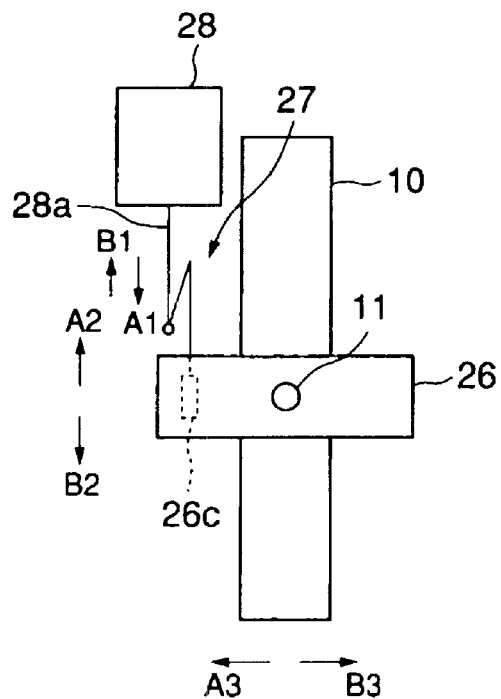

Referring to FIGS. 5A and 5B, the turning link mechanism 27A of the second turning mechanism 27 has one end joined to an axially movable drive shaft 28a included in the motor 28 by a ball joint, and the other end joined by a ball joint to a joint 26c attached to the outer surface of a cross part extending between the opposite side parts of the U-shaped member 26a. When the motor 28 is driven to project the drive shaft 28a in the direction of the arrow A1 shown in FIGS. 5A and 5B, the turning link mechanism 27A pulls up the joint 26c attached to the cross part of the U-shaped member 26a in the direction of the arrow A2 shown in FIGS. 5A and 5B, so that the optical head 10 is turned clockwise as viewed in FIG. 5B, so that the laser beam projecting end of the optical head 10 is moved in the direction of the arrow A3 shown in FIG. 5B.

When the motor 28 is driven to retract the drive shaft 28a in the direction of the arrow B1 shown in FIGS. 5A and 5B, the turning link mechanism 27A pushes down the joint 26c attached to the second turning frame 26 in the direction of the arrow B2 and the optical head 10 is turned counterclockwise as viewed in FIG. 5B, so that the laser beam projecting end of the optical head 10 is moved in the direction of the arrow B3 shown in FIG. 5B.

The first turning mechanism 23 turns the optical head 10 in a direction perpendicular to a weld line (groove) K, and the second turning mechanism 27 turns the optical head 10 in a direction of the weld line K.

In the present embodiment, the optical head 10 can be turned about two axes perpendicular to each other. Accordingly, the laser beam can be accurately projected on the groove even if the groove is curved in a complicated shape. Since the optical head 10 can be turned to make the laser beam projecting end of the optical head 10 perform a circular motion, complicated weaving operation is possible.

Various modifications of the laser beam projectors in the foregoing embodiments are possible.

Figure 6A:
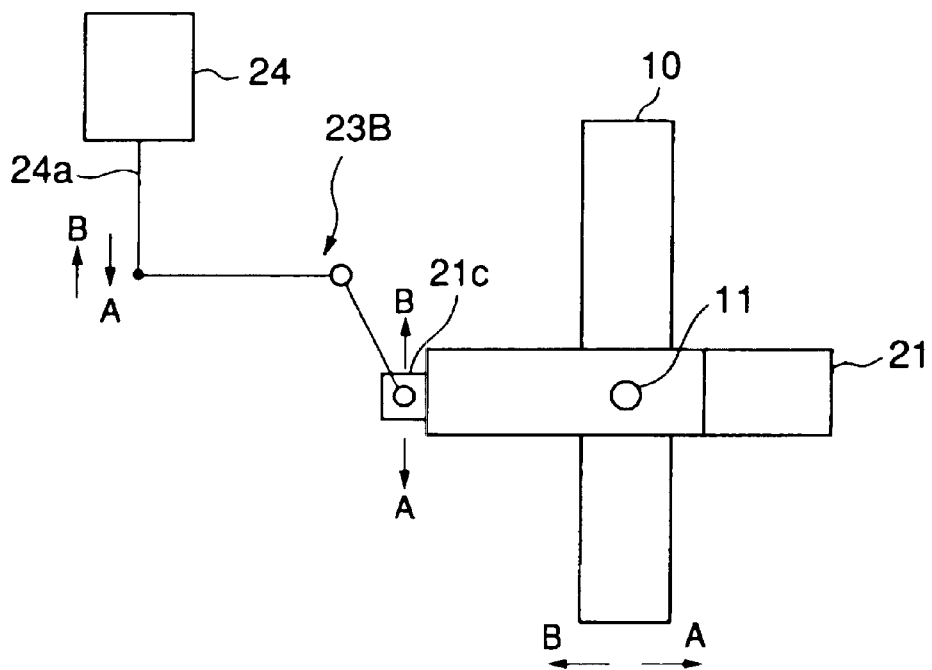
FIGS. 6A and 6B are schematic side elevations of a turning mechanism for turning a first turning frame and a turning mechanism for turning a second turning frame included in the laser beam projector shown in FIG. 4.

As shown in FIG. 6A, the first turning mechanism 23 of the previous embodiments may be provided, instead of the turning link mechanism 23A, with a turning link mechanism 23B formed by pivotally joining two links by a joint, and having one end fixed to the drive shaft 24a of the motor 24 and the other end pivotally joined to the joint 21c of the turning frame 21.

Figure 6B:
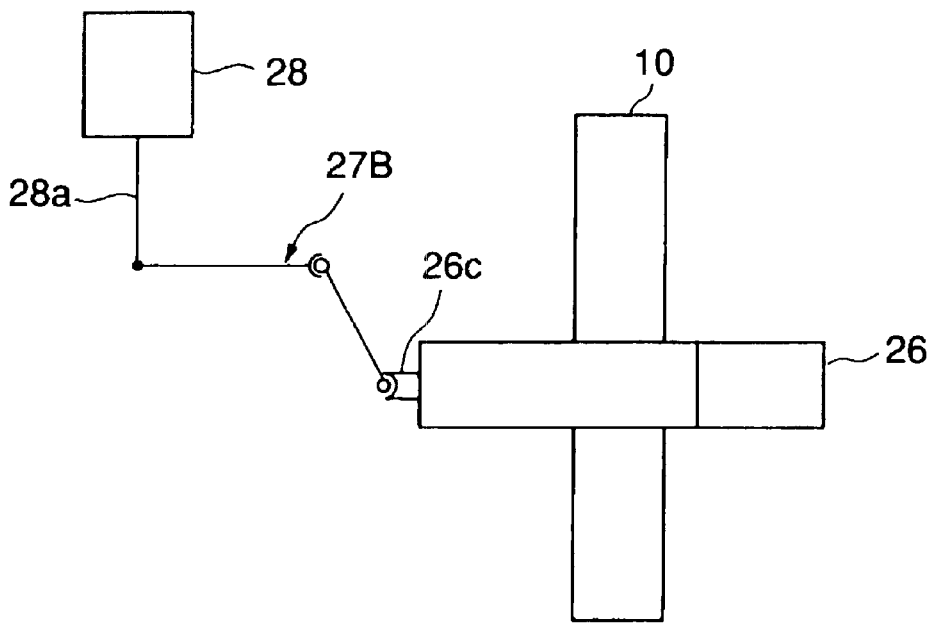

As shown in FIG. 6B, the second turning mechanism 27 of the previous embodiment may be provided, instead of the turning link mechanism 27A, with a turning link mechanism 27B formed by pivotally joining two links by a ball joint, and having one end fixed to the drive shaft 28a of the motor 28 and the other end pivotally joined by a ball joint to the joint 26c of the turning frame 26.

When using the turning link mechanism 23B (27B), the turning direction of the optical head 10 when the drive shaft 24a (28a) is projected or retracted is opposite to the turning direction of the optical head 10 when using the turning link mechanism 23A (27B).

Although the invention has been described as applied to a welding robot, the present invention is applicable also to various automatic welding machines.

As apparent from the forgoing description, according to the present invention, the spot of the laser beam can be accurately located on the portion to be welded by turning the optical head, and the reaction force that acts on the holding-turning mechanism when the optical head is thus turned to adjust the position of the laser beam on the workpiece is lower than the reaction force which will act on a holding mechanism when the optical head is translated for the same purpose. Moreover, weaving laser beam welding can be achieved by periodically turning the optical head alternately in opposite directions.

According to the preferred embodiment of the present invention, since the optical head is rotatably supported at the position corresponding to the axis passing the center of gravity thereof, the moment of inertia is small and hence the reaction force that acts on the holding mechanism is further low.

Since the optical head of the laser beam projector in the preferred embodiment can be turned about the two axes perpendicular to each other in a direction perpendicular to the weld line and in a direction of the weld line, the spot of the laser beam can be further accurately located on the portion to be welded and complicated weaving operations can be achieved.

Since the linear motion of the drive shaft of the motor is converted into a turning motion of the turning frame by the turning link mechanism without using any reduction gear, the turning frame can be turned without any lost motion which may be caused by backlashes in a reduction gear, and, consequently, the spot of the laser beam can be further accurately located on the portion to be welded.

Since the optical head in the preferred embodiment can be turned about two axes perpendicular to each other, the laser beam can be accurately projected on the groove even if the groove is curved in a complicated shape.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A laser beam projector, comprising:
   an optical head that projects a laser beam; and
   a holding-turning mechanism that holds and turns the optical head so as to turn the optical head in a direction perpendicular to a moving direction of the laser beam projector, the holding-turning mechanism being configured to be attached to a robot arm.

2. The laser beam projector according to claim 1, wherein the holding-turning mechanism holds the optical head so that the optical head is able to turn about an axis passing a center of gravity of the optical head.

3. The laser beam projector according to claim 1, wherein the holding-turning mechanism includes a first holding-turning unit that turns the optical head in a direction perpendicular to a weld line and a second holding-turning unit that turns the optical head in a direction of the weld line.

4. The laser beam projector according to claim 2, wherein the holding-turning mechanism includes a first holding-turning unit that turns the optical head in a direction perpendicular to a weld line and a second holding-turning unit that turns the optical head in a direction of the weld line.

5. The laser beam projector according to claim 1, wherein the holding-turning mechanism includes a turning link mechanism that transmits a driving force to the optical head in order to turn the optical head.

6. The laser beam projector according to claim 2, wherein the holding-turning mechanism includes a turning link mechanism that transmits a driving force to the optical head in order to turn the optical head.

7. The laser beam projector according to claim 3, wherein the holding-turning mechanism includes a turning link mechanism that transmits a driving force to the optical head in order to turn the optical head.

8. The laser beam projector according to claim 4, wherein the holding-turning mechanism includes a turning link mechanism that transmits a driving force to the optical head in order to turn the optical head.

9. The laser beam projector according to claim 1, wherein the optical head emits a YAG laser beam.

10. A robot, comprising:

a robot arm; and a laser beam projector attached to the robot arm, the laser beam projector including an optical head that projects a laser beam and a holding-turning mechanism that holds and turns the optical head so as to turn the optical head in a direction perpendicular to a moving direction of the laser beam projector, the holding-turning mechanism being configured to be attached to the robot arm.

11. The robot according to claim 10, wherein the holding-turning mechanism holds the optical head so that the optical head is able to turn about an axis passing a center of gravity of the optical head.

12. The robot according to claim 10, wherein the holding-turning mechanism includes a first holding-turning unit that turns the optical head in a direction perpendicular to a weld line and a second holding-turning unit that turns the optical head in a direction of the weld line.

13. The robot according to claim 11, wherein the holding-turning mechanism includes a first holding-turning unit that turns the optical head in a direction perpendicular to a weld line and a second holding-turning unit that turns the optical head in a direction of the weld line.

14. The robot according to claim 10, wherein the holding-turning mechanism includes a turning link mechanism that transmits a driving force to the optical head in order to turn the optical head.

15. The robot according to claim 11, wherein the holding-turning mechanism includes a turning link mechanism that transmits a driving force to the optical bead in order to turn the optical head.

16. The robot according to claim 12, wherein the holding-turning mechanism includes a turning link mechanism that transmits a driving force to the optical head in order to turn the optical head.

17. The robot according to claim 13, wherein the holding-turning mechanism includes a turning link mechanism that transmits a driving force to the optical head in order to turn the optical head.

18. The robot according to claim 10, wherein the optical head emits a YAG laser beam.

19. The laser beam projector according to claim 1, wherein the holding-turning mechanism is configured to be attached to an extremity of the robot arm.

20. The robot according to claim 10, wherein the holding-turning mechanism is configured to be attached to an extremity of the robot arm.

* * * * *